US008676614B2

(12) United States Patent
Smith

(10) Patent No.: US 8,676,614 B2
(45) Date of Patent: Mar. 18, 2014

(54) AUTOMATED AIRLINES RESERVATIONS SYSTEM

(75) Inventor: Carline Smith, Roanoke, TX (US)

(73) Assignee: AMR Corporation, Forth Worth, TX (US)

( * ) Notice: Subject to any disclaimer, the term of this patent is extended or adjusted under 35 U.S.C. 154(b) by 588 days.

(21) Appl. No.: 10/800,414

(22) Filed: Mar. 12, 2004

(65) Prior Publication Data

US 2005/0203782 A1     Sep. 15, 2005

(51) Int. Cl.
*G06Q 10/00* (2012.01)
*G06Q 50/00* (2012.01)

(52) U.S. Cl.
USPC .......................................... 705/5; 705/14.33

(58) Field of Classification Search
USPC ............................................. 705/5–6, 14.33
See application file for complete search history.

(56) References Cited

U.S. PATENT DOCUMENTS

| | | | | |
|---|---|---|---|---|
| 5,854,837 | A * | 12/1998 | Trader et al. | 379/265.01 |
| 5,948,040 | A * | 9/1999 | DeLorme et al. | 701/201 |
| 6,009,412 | A * | 12/1999 | Storey | 705/14.27 |
| 6,282,649 | B1 * | 8/2001 | Lambert et al. | 713/167 |
| 6,509,829 | B1 * | 1/2003 | Tuttle | 340/10.1 |
| 6,512,964 | B1 * | 1/2003 | Quackenbush et al. | 700/226 |
| 6,594,640 | B1 * | 7/2003 | Postrel | 705/14.27 |
| 6,662,078 | B1 * | 12/2003 | Hardgrave et al. | 705/5 |
| 6,836,537 | B1 * | 12/2004 | Zirngibl et al. | 705/6 |
| 7,076,446 | B1 * | 7/2006 | Kennard | 705/14.14 |
| 2001/0016825 | A1 * | 8/2001 | Pugliese et al. | 705/5 |
| 2001/0037243 | A1 * | 11/2001 | Rouston et al. | 705/14 |
| 2001/0047264 | A1 * | 11/2001 | Roundtree | 704/275 |
| 2002/0111859 | A1 * | 8/2002 | Sheldon et al. | 705/14 |
| 2002/0178034 | A1 * | 11/2002 | Gardner et al. | 705/5 |
| 2003/0055689 | A1 * | 3/2003 | Block et al. | 705/5 |
| 2004/0107136 | A1 * | 6/2004 | Nemirofsky et al. | 705/14 |
| 2004/0111279 | A1 * | 6/2004 | Schoen et al. | 705/1 |
| 2004/0230481 | A1 * | 11/2004 | Bushold et al. | 705/14 |

OTHER PUBLICATIONS

Anderson-Lehman, et al., Continental airlines takes off with real-time business intelligence. Technical report, Teradata University Network, Available at http://www.teradata.com/t/page/133201/index.html, 1998.*

Van Oleson, et al., Operational Information Systems: An Example from the Airline Industry, WIESS, 2000.*

* cited by examiner

*Primary Examiner* — Daniel Vetter
(74) *Attorney, Agent, or Firm* — Ward & Zinna, LLC

(57) ABSTRACT

Disclosed is an automated reservations system for use with a frequent flyer account or other similar awards account. The automated reservations system initially authenticates customers utilizing one or more forms of identification. The customer is then prompted to provide travel itinerary information to the reservations system by a series of voice prompt menus. Utilizing the customer-entered itinerary information, the automated reservations system queries a flight information database to determine if the requested itinerary is available. The automated reservations system then determines if the customer has the required amount of frequent flyer miles to book the requested itinerary. If the customer has the required amount of frequent flyer miles, the automated reservations system allows the customer to either ticket or hold the requested itinerary. The automated reservations system is also capable of assigning seats for each passenger in the customer's itinerary.

22 Claims, 14 Drawing Sheets

AUTOMATED AIRLINES RESERVATIONS SYSTEM

FIELD OF THE INVENTION

The present invention relates generally to the field of automated interactive voice response ("IVR") reservations systems. In particular, the present invention relates to a fully automated frequent flyer IVR reservations system capable of interpreting, recognizing, and responding to spoken user responses that may be accessed by utilizing security identification such as a frequent flyer number, personal identification number, or a zip code.

BACKGROUND OF THE PRESENT INVENTION

Typically, Interactive Voice Response ("IVR") systems are accessed by dialing a local telephone number, an "800" toll-free telephone number, or a "900" pay-to-dial telephone number. Generally, IVR systems are comprised of Automatic Call Distributors ("ACDs") and Voice Response Units ("VRUs"). The function of the ACD is to route high volume inbound telephone calls to the appropriate destinations (i.e., the proper VRU or the proper agent depending on the minimum expected delay and the longest available agent) and to provide a general structure for managing the customer premises telephone equipment ("CPE"). Specifically, the ACD queues incoming telephone calls to provide a user of the IVR system access to the appropriate first-available destination. The ACD is also capable of playing recorded messages, providing simple prompts, and customized call handling based on call volume or time of day transfer.

The VRU determines the service or information desired by a caller based on information provided by the caller. Callers access information by selecting voice menu prompt options from the voice menus generated by the VRU. Based on the responses received, the VRU transmits the requested information, further prompts the caller for additional menu selections, or transfers the caller to a live agent.

In general, when a caller dials the telephone number associated with the desired IVR system, the inbound telephone call is answered by the caller's local exchange carrier ("LEC") switch. The LEC switch may route a call directly or transfer the call to an inter-exchange carrier for routing.

After the inbound telephone call is routed to the appropriate inter-exchange carrier, the inbound telephone call is routed to an ACD, VRU, or live agent. At this stage, prompt menus may be provided to the caller to determine the function of the system required by the caller. The prompt menu may consist of an informational prompt or may consist of voice instructions directing the caller to enter information using the caller's touch-tone telephone keypad. In the past, the caller was limited to entering information utilizing the caller's telephone keypad to produce Dual Tone Multiple Frequency ("DTMF") tones which were interpreted by a tone decoder located in the IVR system. However, the improvement in speech recognition technology in recent years has allowed IVR systems to utilize spoken responses by callers. The spoken responses are received and interpreted by speech recognition software located in the IVR system.

The simplest IVR systems allow a caller to retrieve information about specific topics. For example, a caller may dial an automated weather service to access the current weather conditions in a particular area. The inbound telephone call is received from the inter-exchange carrier by an ACD which provides an introductory message prompt to the caller and routes the inbound telephone call to the appropriate VRU. However, if no VRUs are available, the caller is placed in a temporary queue to await the next available VRU. The VRU provides the caller with a voice prompt menu directing the caller to enter information related to the caller's query. This may be represented by a caller entering a desired city, a zip code, etc. The automated weather service then accesses a national weather database or other similar source to provide the requested weather information to the caller.

As another example, a caller may dial a telephone number associated with a movie schedule IVR to inquire about the movie schedule at a particular movie theatre. In this example, after the proper inter-exchange carrier has been determined by the LEC, the inbound telephone call is transferred directly to a VRU. The VRU directs the caller to enter a zip code or other similar information indicating the desired location such as a city, zip code, etc. The movie schedule IVR queries a movie theatre database or other such database to determine the movie theatres around the caller-entered location. Utilizing the results of the query, the movie schedule IVR directs the caller to choose the desired movie theatre from a voice prompt menu. After the caller chooses the desired movie theatre, the caller is provided the times and listings of all movies playing at the selected movie theatre.

Alternatively, the VRU may direct the caller to enter the name of the movie utilizing the letters associated with each button on the caller's telephone keypad. After the movie selection is made, the movie schedule IVR system directs the caller to enter the desired location of the movie utilizing such information as a city, zip code, etc. Based on the inputted information, the movie schedule IVR system accesses a movie schedule database to determine if the selected movie is playing in the selected location. The movie schedule IVR system then directs the caller to select options from a movie theatre voice prompt menu formed from the results of the movie schedule database query. After the caller makes a selection from the movie theatre voice prompt menu, the caller is provided the times that the selected movie is playing at the selected movie theatre.

One industry which utilizes IVR systems extensively is the airline industry. Historically, the airline industry has used IVR systems for many applications including customer service, automated flight information, automated reservations, and automated frequent flyer account maintenance. Typically, the customer service IVR systems utilized in the airline industry comprise ACDs, VRUs, and live agents and are typically accessed via an "800" toll-free telephone number. Generally, an airline customer service IVR system greets an inbound telephone call with an introductory voice prompt and provides the caller with a voice prompt menu. Typically, the voice prompt menu consists of options which allow the software to properly route the call (e.g., the call to be transferred to a live agent or another IVR system, such as a flight information IVR system). In this manner, customer service IVR systems function as a "front-end" to the other IVR systems (e.g., reservations, flight information, etc.) provided by the airline.

An automated flight information IVR system is typically comprised of ACDs and VRUs and is accessed via an "800" toll free telephone number. Generally, the ACDs receive the inbound telephone calls from the inter-exchange carrier and route the calls to the appropriate ACD, which, in turn, routes the inbound telephone call to the appropriate VRU. Each VRU in an automated flight information IVR system often contains the same programming and serves the same function. The VRU greets the caller with a voice prompt and directs the caller to enter information related to the desired flight. The information may include a flight number, date of departure/arrival, time of departure/arrival, etc. Utilizing this information, the VRU queries a flight information database and provides the requested flight information to the caller. Many third-party entities maintain real-time flight information databases which may be utilized with a flight information IVR system. However, the flight information IVR system may contain its own real-time flight information database.

The reservations IVR systems typically employed in the airline industry are accessed via an "800" toll-free telephone number and consist of ACDs and VRUs. Generally, the reservations IVR systems gather itinerary data from a caller and then transfer the caller to a live reservations agent. For example, an international reservations IVR system for an airline may direct the caller to provide information about the caller's desired itinerary. The requested information may include the desired departure city, desired arrival city, desired departure date, desired arrival date, desired departure time, desired arrival time, class of service (i.e., economy class, business class, first class, etc.), seating preference, etc. The reservations IVR system may utilize caller's vocal responses or caller-entered DTMF tones produced by the caller's keypad.

Once the caller has entered the requisite information in response to the international reservations IVR system's voice prompt menus, the caller-entered itinerary information may be transferred to a live reservations agent via a "screen pop." Screen-pop is a common method known in the art for transferring caller-entered itinerary information to a live reservations agent. The reservations agent then utilizes the transferred caller itinerary information to search a flight database accessible from the reservation agent's computer terminal. Utilizing the results of the flight information database query, the reservations agent provides the caller a few possible flight itineraries and the system instructs the caller to select from the itineraries presented. If a caller chooses to select one of the presented flight itineraries, the reservation agent obtains credit card information or other payment information from the caller and completes the caller's requested transaction.

Alternatively, instead of transferring the gathered caller information to a reservations agent, the reservations IVR system may access a flight information database and provide the caller with a voice prompt menu listing flight itineraries which closely match the caller's requested itinerary. The caller may then choose the desired flight itinerary from the voice prompt menu. Based on this input, the reservations IVR system queries the caller for payment information, such as a credit card number and expiration date. The system verifies the caller's credit card information and then completes the caller's transaction for the requested itinerary. By utilizing this system instead of a live reservations agent to process the caller's requested itinerary and verify the caller's credit card information, the amount of time required by live reservations agents to assist callers is reduced. This lowers operating costs for the airline since less reservations agents must be employed.

Many travel organizations also operate and maintain frequent flyer IVR systems which allow a caller to perform frequent flyer account maintenance. Generally, frequent flyer IVR systems require authentication for use of the system. For example, the frequent flyer IVR system may require that the caller enter the caller's frequent flyer number and associated PIN. Other authentication information or combinations of authentication information such as a social security number, home telephone number, birth date, zip code, etc., may also be utilized by the frequent flyer IVR system to authenticate a caller. After the frequent flyer IVR system authenticates a caller, the caller is provided with a voice prompt menu providing a series of account maintenance options. The voice prompt menu may consist of options allowing a caller to inquire about the amount of frequent flyer miles in a caller's account, allow the caller to change the caller's authentication information, allow the caller to check on the status of reservations made utilizing frequent flyer miles, etc. Frequent flyer information IVR systems currently utilized allow a caller to choose options from voice prompt menus or enter information utilizing vocal responses or the caller's keypad to produce DTMF tones.

SUMMARY OF INVENTION

The main objective of the present invention is to expand and improve upon the functionality of existing reservation systems. Specifically, the present disclosure provides a fully automated reservations system capable of reducing the amount of time required by customers and reservations agents to book reservations. For example, certain key aspects of the present invention include the ability to authenticate users, book and hold reservations, provide different itineraries, and assign seats. In particular, the present invention is designed to function with a frequent flyer system and utilize the frequent flyer miles in a customer's account to book, hold, or complete a reservation without human intervention. The present invention also may include a baggage information system and a notification system which alerts customers when changes to booked or reserved itineraries have been made.

Although different systems and methods exist for routing a telephone call trough the existing local exchange carrier and inter-exchange carrier infrastructure, an inbound telephone call often terminates at a voice response unit. At the VRU, the customer is interfaced with the reservations system of the present invention. The customer is initially provided a voice prompt menu by the VRU for selecting the options of making a reservation or locating baggage utilizing the baggage information portion of the reservations system.

If the customer selects the option of making a reservation from the initial voice prompt menu provided by the VRU, the customer is required to provide authentication information. The reservations system is capable of accepting and analyzing either customer's vocal responses or customer-entered DTMF tones; however, in the preferred embodiment of the present invention, speech recognition is utilized. For example, if the customer wishes to make a reservation utilizing the customer's frequent flyer miles account, the customer is initially prompted to provide one or more forms of authentication to verify that the customer has a preexisting frequent flyer account established with the system. For example, the reservations system may require that a customer enter a frequent flyer number or zip code with an associated PIN. Any other authentication information or combinations of authentication information including a social security number, a telephone number, a birth date, etc. may also be utilized with the present invention. In addition, other functionality developed within the call system or routing structure may be utilized to verify a caller. For example, a customer may be identified based on the identification of the calling party's telephone number or other identification means developed by a local exchange carrier or inter-exchange carrier. The reservations system then queries a database containing authentication information, such as a frequent flyer account database, to authenticate the customer-entered authentication information. Based upon the results of the frequent flyer account database query, the reservations system denies or grants the customer access to the reservations system.

The system of the present invention may also utilize biometric authentication means, such as voice-print technology, to authenticate callers. For example, the system of the present invention may ask the customer to state a particular phrase, such as the customer's name. Speech voice print software embedded in the reservations system then compares the phrase uttered by the customer to the customer's stored voice profile. The system of the present invention may utilize any method of voice recognition to authenticate the customer. If the speech recognition software confirms a positive match, the customer is granted access to the reservations system.

Alternatively, if a customer does not have a preexisting account, the reservations system can create an account for the new user. In this scenario, the reservation system acquires all of the information needed to create a frequent flyer account for the customer and then stores the information in the customer database. However, in one embodiment, the customer cannot utilize the new frequent flyer account until the customer obtains frequent flyer miles.

After the reservations system authenticates the customer, the reservations system collects information from the customer necessary to make a flight reservation. The customer is prompted to provide such information as departure/arrival cities, connecting cities, dates and times, desired class of travel, number of passengers, etc. In the preferred embodiment of the present invention, the customer is able to provide this information to the reservations system utilizing spoken responses. The customer may, however, utilize the customer's telephone keypad to produce DTMF tones or any other similar means to communicate this information to the reservations system.

If the customer is attempting to utilize frequent flyer miles to make an Awards reservation, the reservations system first accesses an Awards database to determine if the customer has the necessary amount of frequent flyer numbers specified by an awards database. The awards database consists of a look-up table which details the amount of frequent flyer miles required for different flight itineraries. If the customer does not have enough frequent flyer miles, the reservations system notifies the customer and may ask if any alternative flight reservations are desired.

If the customer has the required amount of frequent flyer miles to book the desired flight, the reservations system accesses a database containing flight information to determine if the customer's desired itinerary is available. If the customer's itinerary is not available, the customer can attempt to make another reservation or can terminate the call. If the customer's flight itinerary is available, the reservations system presents all the details of the flight to the customer and possibly one or more additional flights which may also appeal to the customer.

The customer is given the option of either holding or booking the flight itinerary provided by the reservations system. If the customer chooses to hold the reservation, the customer's selected itinerary is stored and the customer is provided a reference number by the reservations system. If the customer later wishes to book the held flight, the customer is required to supply the reference number to the reservations system. The reservations system utilizes the reference number to retrieve the customer's itinerary from the hold database. The customer may then book the flight if desired.

If the customer elects to book the flight provided by the reservations system, the system may then ask for a credit card number or other payment information. Any method of processing telephone transactions known in the art may be utilized to process the customer's ticketing request. The customer's ticket(s), itinerary, and receipt may then be delivered to the customer electronically. Alternatively, these documents may be mailed to the customer or picked up at the airport. The customer may also utilize the flight reservations system to select seats for the different segments of the customer's itinerary.

If the customer selects the option of locating baggage from the initial voice prompt menu provided by the VRU, the customer is first welcomed to the baggage system and directed to provide the arrival city (i.e., the destination of the baggage). The customer is next directed to provide the arrival date of the baggage. Utilizing the arrival city and arrival date, the baggage information system queries a baggage database which returns a list of all baggage records for the specified city and date.

The customer is then directed to provide the customer's travel information associated with the baggage. The tracer is a combination of letters and/or alphanumeric characters assigned to each piece of baggage as the baggage is checked before the customer's flight. Utilizing the customer's name and the tracer, the baggage information system accesses the list returned from the initial query to determine the status of the customer's baggage. The resulting baggage information is then provided to the customer.

The present invention also incorporates a notification system which notifies a customer if any changes occur to the customer's planned flight itinerary. When a change occurs, the notification system sends a text or voice message to the customer's preferred means of contact stored in the customer's profile. The methods of contact may include a cellular telephone, e-mail or other computer-based customer notification, a pager, a personal digital assistant, a telephone, a fax machine, or other like modes for contacting an individual. The customer may choose to receive flight status at a scheduled time, if changes occur, or both.

Therefore, it is an object of the present invention to provide an automated reservations system capable of authenticating a customer, booking and holding flight reservations, providing different itineraries to customers based upon customer queries, ticketing flights, and assigning seats.

It is also an object of the present invention to provide an automated reservations system additionally containing a baggage information system for assisting customers in locating their baggage.

It is an object of the present invention to provide an automated reservations system capable of receiving and interpreting customers' vocal responses.

An additional object of the present invention is to reduce the amount of time required for customers to make flight reservations.

Still another object of the present invention is to provide an automated reservations system capable of routing customers to live reservations agent.

Another object of the present invention is to provide an automated reservations system including a notification system for notifying customers of changes to a booked or reserved itinerary.

BRIEF DESCRIPTION OF THE DRAWINGS

A further understanding of the present invention can be obtained by reference to the preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of a preferred embodiment of the present invention.

The automated reservations system of the present invention is described with reference to an automated frequent flyer number reservations system wherein a customer may utilize accumulated frequent flyer numbers to make travel reservations. However, it would be apparent to one skilled in the art that the present invention may be utilized in any circumstance which requires an automated reservations system including, but not limited to, mass transportation, entertainment events (e.g., music concerts, sporting events, etc.), etc.

Figure 1:
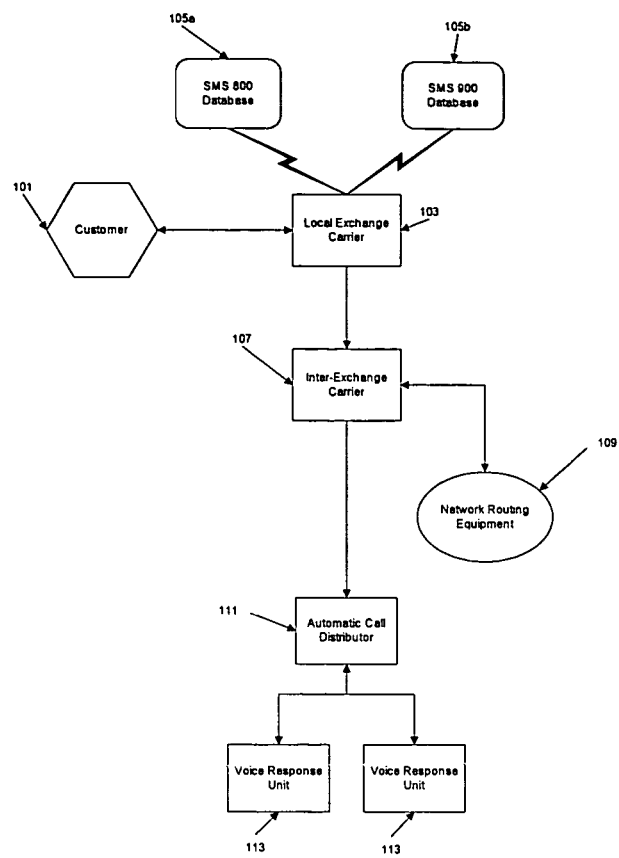
FIG. 1 depicts a hardware schematic detailing the call flow of a typical inbound telephone call to the automated reservations system of the present invention.

Referring first to FIG. 1, shown is an exemplary hardware schematic detailing the call flow of an inbound telephone call to the reservations system of the present invention. Customer 101 initially dials the telephone number associated with the reservations system of the present invention. For example, the telephone number may be either a local telephone number, an "800" toll-free telephone number, or a "900" pay-to-dial telephone number. The inbound telephone call is answered by the customer's 101 local exchange carrier ("LEC") 103. When appropriate, LEC 103 accesses a continuously updated Service Management System ("SMS") 800 database 105a and SMS 900 database 105b to determine the proper inter-exchange carrier 107 for handling the telephone call. SMS 800 database 105a includes a look-up table of all registered "800" toll-free telephone numbers and their associated inter-exchange carriers 107. Similarly, SMS 900 database 105b includes a look-up table of all registered "900" pay-to-dial telephone numbers.

After the inbound telephone call has been routed to the appropriate inter-exchange carrier 107, inter-exchange carrier 107 performs a routing function via network routing equipment 109. The network routing equipment software then selects the optimum ACD 111 capable of handling the inbound telephone call and returns the appropriate routing label back to inter-exchange carrier 107.

A continuous, real-time monitoring link is established between network routing equipment 109 and ACDs 111. The longest available agent and the minimal expected delay for an inbound telephone call is analyzed to determine which ACD 111 is capable of most efficiently handling the inbound telephone call and providing the service requested by customer 101.

Based on the routing decision, the inbound telephone call is routed to the proper ACD 111. If ACD 111 is incapable of routing the inbound telephone call immediately to VRU 113, ACD 111 places the customer in a queue to await the next available VRU 113. FIG. 1 depicts an ACD 111 connected to two VRUs 113. However, any number of ACDs 111 and VRUs 113 may be utilized with the system of the present invention. At VRU 113, customer 101 is interfaced with the automated reservations system of the present invention as described below. Optionally, customer 101 may be transferred to reservations agent 115 at any point during the call flow by saying "agent." Additionally, the reservations system of the present invention may transfer customer 101 to reservations agent 115 in circumstances when the reservations system of the present invention cannot accommodate customer's 101 requests.

Figure 2:
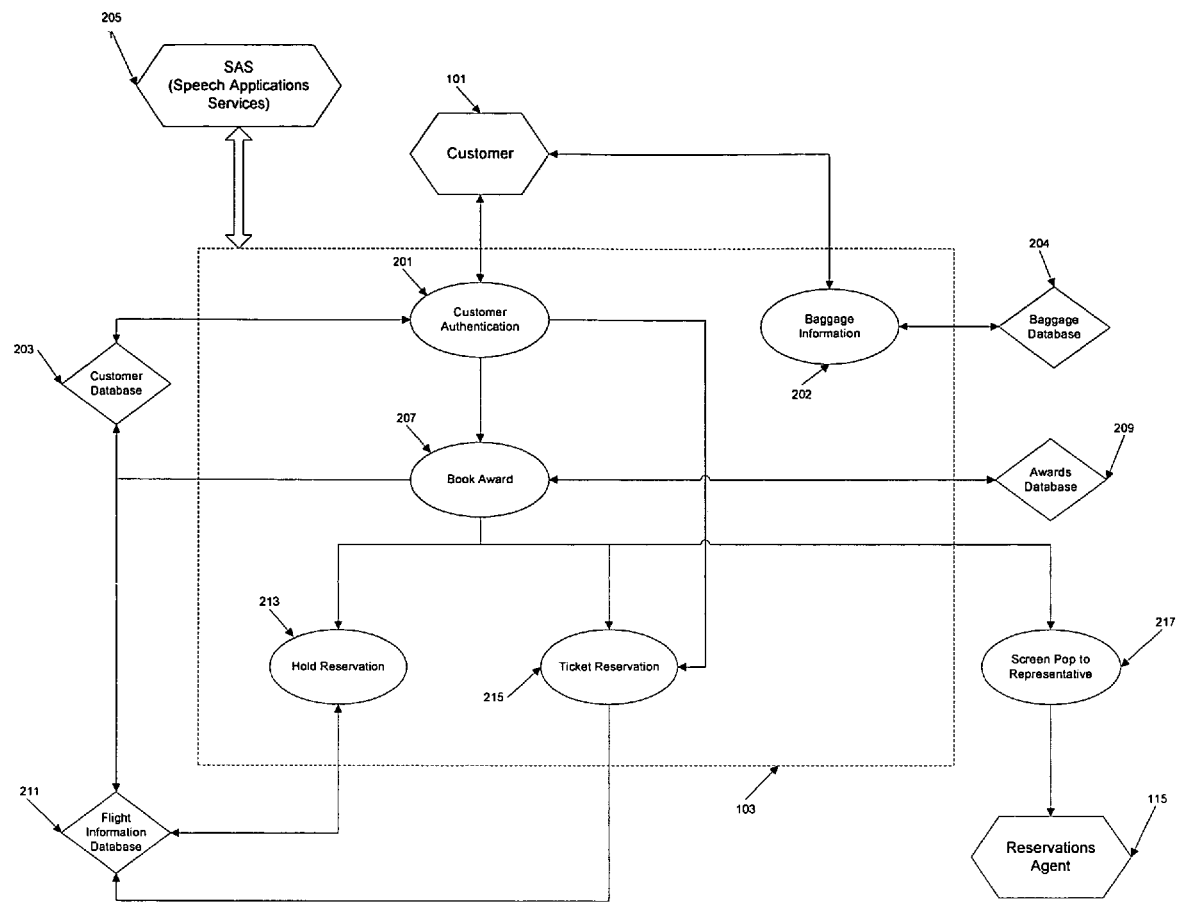
FIG. 2 depicts the call flow diagram utilized in the automated reservations system of the present invention.

Shown in FIG. 2 is the call flow diagram for use in the automated reservations system in the preferred embodiment of the present invention. Typically, customer 101 accesses IVR system 103 by dialing a telephone number associated with the reservations system. In the preferred embodiment of the present invention, customer 101 is initially prompted to choose to make a reservation or to locate baggage utilizing the baggage information system 202. If customer 101 chooses to make a reservation, customer 101 is required to provide authentication information in order to access the reservations system. The authentication information can include any type or combination of information that uniquely identifies customer 101, such as a frequent flyer number and associated PIN, a social security number, birth date, etc. Customer 101 is authenticated by IVR system 103 in customer authentication step 201. Customer authentication step 201 authenticates customer 101 by acquiring the required identification data from customer 101, comparing the data to information contained in customer database 203, and granting access to the reservations system if the customer-entered information is correct. Authentication step 201 utilizes SAS module 205 to interpret the vocal responses provided by customer 101.

Customer authentication step 201 may optionally utilize biometric authentication, such as voice recognition, to authenticate customer 101. For example, to authenticate a customer utilizing voice authentication, customer authentication step 201 prompts customer 101 to speak a certain phrase, such as his or her name. Customer authentication step 201 then compares the uttered phrase to voice profiles stored in customer database 203. If the customer-spoken phrase is valid, customer authentication step 201 grants customer 101 access to the reservations system.

Customer 101 is then routed to book award step 207. Book award step 207 acquires the required itinerary data from customer 101. Itinerary data includes all information necessary to make a reservation such as the desired departure city, arrival city, travel dates, travel times, number of passengers, class of service, etc. In the preferred embodiment of the present invention, the itinerary data is acquired from customer 101 through vocal responses. The vocal responses are interpreted by book award step 207 utilizing SAS module 205.

Utilizing the customer-entered itinerary data, book award step 207 queries awards database 209 to determine the number of frequent flyer miles needed for the requested itinerary. Book award step 207 then queries customer database 203 to determine if customer 101 has sufficient frequent flyer miles. If customer 101 does not have the required amount of frequent flyer miles as specified by awards database 209, book award step 207 notifies customer 101 that sufficient frequent flyer miles are not available for the desired itinerary.

If customer 101 has sufficient frequent flyer miles available, book award step next queries flight information database 211 to determine if the requested itinerary is available. If the requested itinerary is available, book award step 207 provides customer 101 with the itinerary and possibly a number of closely related itineraries. Closely related itineraries are any itineraries that differ from the requested itinerary only slightly. For example, book award step 207 may announce to customer 101 the desired itinerary and an additional itinerary which differs in class of service from the desired itinerary.

If the requested desired itinerary is not available, book award step 207 notifies customer 101 that the requested itinerary is not available and then provides customer 101 with a predetermined number of closely related itineraries. Customer 101 may alternatively request another itinerary by providing new itinerary data to book award step 207.

Book award step 207 next provides customer 101 with the options of ticketing the reservation, holding the reservation, or transferring to a reservations agent. If customer 101 elects to hold the reservation, customer 101 is routed to hold reservation step 213. If the customer wishes to ticket the reservation, customer 101 is routed to ticket reservation step 215.

However, if the caller elects to be routed to reservations agent 115, book award step 207 forwards all customer-entered information to screen pop to agent step 217. Screen pop to agent step 217 provides reservations agent 115 with all the customer-entered data at reservation agent's 107 computer terminal. The customer-entered information is transferred to reservations agent 115 in screen pop to agent step 217 so that reservations agent 115 can more efficiently service customer 101.

Hold reservations step 213 allows customer 101 to put the requested itinerary on hold for a predetermined amount of time. If customer 101 does not ticket the held reservation during the predetermined amount of time, the hold request is cancelled.

Ticket reservation step 215 allows customer 101 to complete a reservations transaction utilizing the reservations system of the present invention. Ticket reservation step 215 acquires all information necessary to issue customer 101 the requested tickets.

However, if customer 101 chooses to locate baggage utilizing baggage information system 202, customer 101 is first welcomed to the baggage system and directed to provide the arrival city (i.e., the destination of the baggage). Customer 101 may provide the requested information to baggage information system 202 utilizing the customer's 101 keypad or vocal responses. Customer 101 is next directed to provide the arrival date of the baggage. The baggage information system 202 queries baggage database 204 which returns a list of all baggage records for the specified city and date.

Customer 101 is then directed to provide the travel information associated with the baggage. The tracer is a combination of letters and alphanumeric characters assigned to each piece of baggage as the baggage is checked before the customer's flight. Utilizing the name and tracer of customer 101, baggage information system 202 accesses the list returned from the initial baggage database 204 query to determine the status of the customer's baggage. The baggage information is then provided to customer 101.

Figure 3:
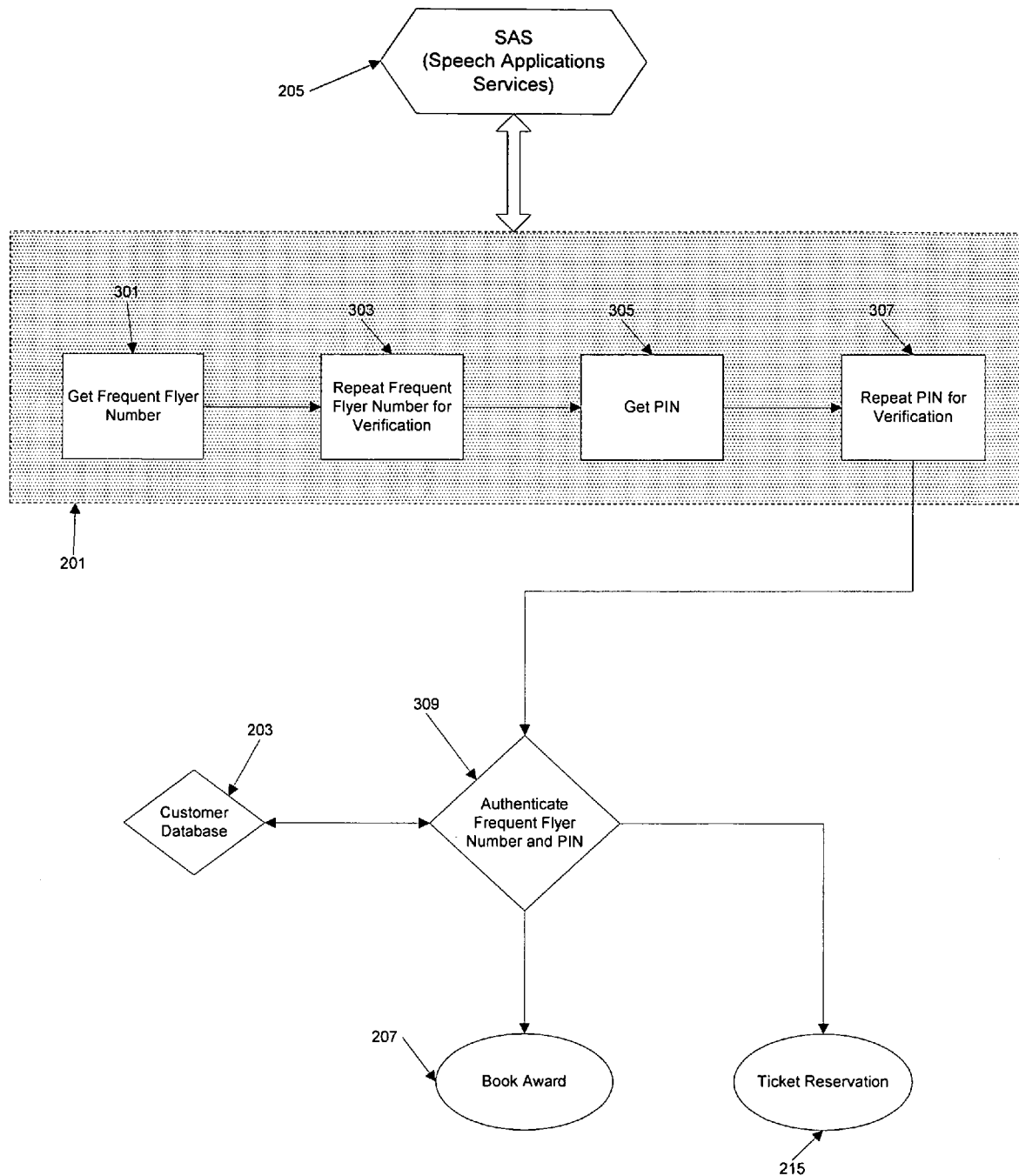
FIG. 3 depicts the customer authentication call script diagram contained in the automated reservations system of the preferred embodiment of the present invention.

Referring next to FIG. 3, shown is the call flow diagram utilized for customer authentication step 201 shown in FIG. 2. The preferred embodiment of caller authentication step 201 utilizes a customer's frequent flyer number in combination with a PIN for authentication. However, any information which uniquely identifies a caller, such as a zip code, telephone number, birth date, social security number, etc., may be used in customer authentication step 201. Biometric authentication methods, such as voice recognition, may also be utilized to authenticate customer 101. First, customer 101 is prompted for a frequent flyer number step 301 to vocally provide a valid frequent flyer number. Get frequent flyer number step 301, as well as all other data acquisition steps utilized by caller authentication step 201, utilize SAS module 205 to recognize and interpret the vocal responses provided by the caller. The frequent flyer number is then repeated to customer 101 by repeat frequent flyer number step 303 accompanied by a request to verify if the frequent flyer number stated by the system is correct. If customer 101 responds "no" to the repeated frequent flyer number, customer 101 is again prompted to enter a frequent flyer number by get frequent flyer number step 301.

Alternatively, if customer 101 verifies the accuracy of the repeated frequent flyer number, customer 101 is then asked to supply an alternative verification such as a PIN. The PIN is then repeated to customer 101 by repeat PIN step 307. If customer 101 responds "no" to the repeated PIN, customer 101 is again prompted to enter a PIN by get PIN step 301.

If customer 101 verifies that the repeated PIN is correct, the customer-entered information is then processed for authentication by authenticate frequent flyer number and PIN step 309. Authenticate frequent flyer number and PIN step 309 queries customer database 203 to verify if the customer-entered frequent flyer number and PIN are valid. If the customer-entered information is valid, customer 101 is then routed to book award step 207 or ticket reservation step 215 if customer 101 has a held reservation. However, if the customer-entered frequent flyer number and PIN are not valid, authenticate frequent flyer number and PIN step 309 delivers an error message to customer 101. For example, authenticate frequent flyer number and PIN step 309 may repeat to the caller "You have entered an incorrect frequent flyer number and PIN. Let's try again." Then, customer 101 is allowed to enter a new frequent flyer number and PIN utilizing customer authentication step 201. Alternatively, the telephone call may be terminated if customer 101 fails to enter a valid frequent flyer number and PIN.

Figure 4:
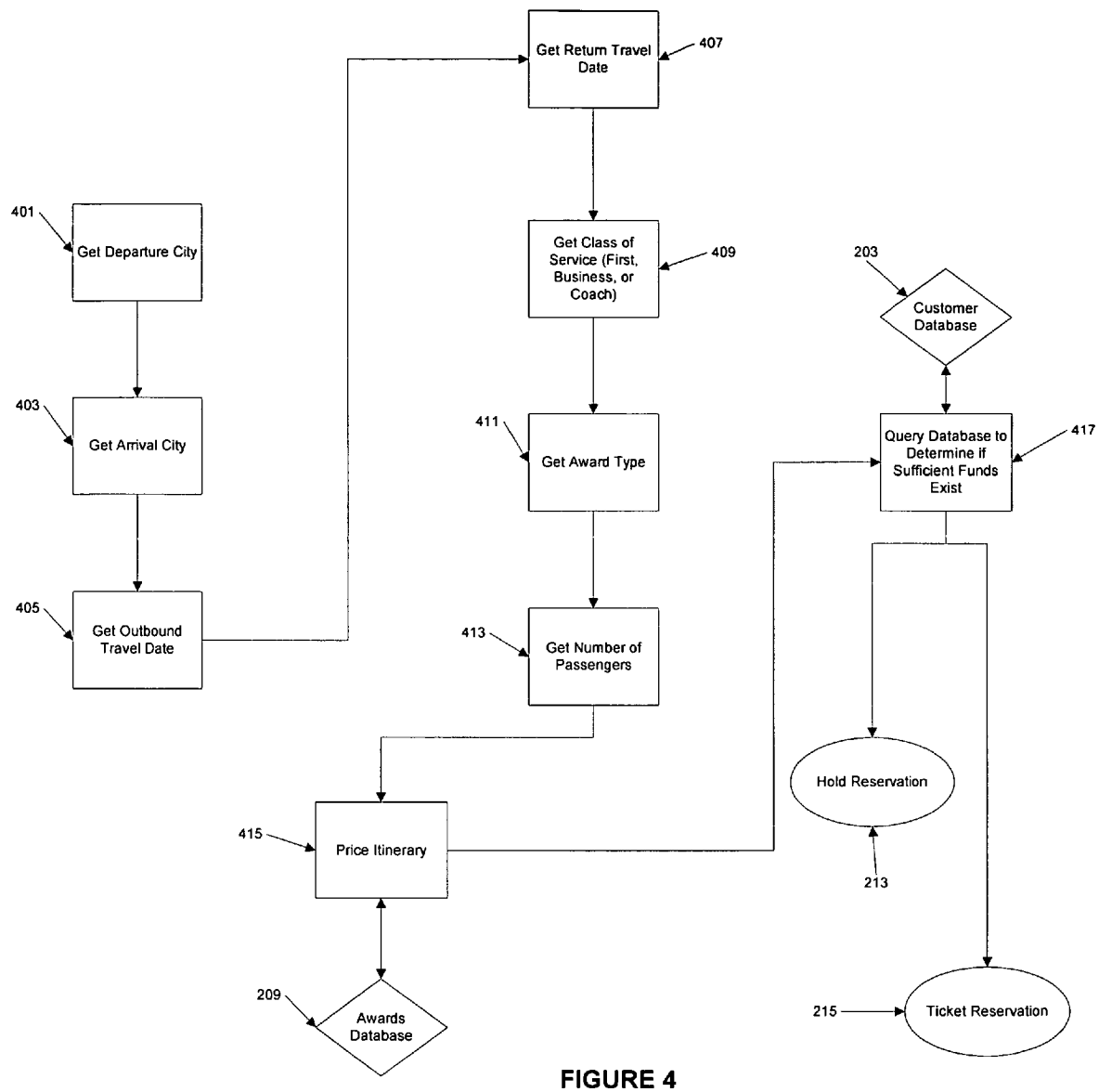
FIG. 4 depicts the awards booking call script diagram contained in the automated reservations system of the preferred embodiment of the present invention.

Now referring to FIG. 4, shown is an expanded view of book award step 207 (initially depicted in FIG. 2). Book award step 207 collects data from customer 101 in order to develop a flight itinerary and determines if the caller's account has sufficient frequent flyer numbers for the selected itinerary. In the preferred embodiment of the present invention, book award step 207 is only accessible to customer 101 if customer 101 was properly authenticated in customer authentication step 201.

Book award step 207 first directs customer 101 to speak the desired departure city in get departure city step 401. Customer 101 preferably provides the departure city to the reservations system through a vocal response. For each data acquisition step in book award step 207, the customer-provided vocal response is received and interpreted by SAS module 205 (not shown). The customer-entered departure city is then repeated to customer 101 for verification. Preferably, book award step 207 requires that all customer-entered data be confirmed by customer 101 before proceeding to the next data acquisition step.

If the customer-entered departure city is not a city from which the airline departs, get departure city step 401 plays an error message to customer 101. An example error message is "We do not travel into or out of <city>, would you like to depart from another city?" If customer 101 responds "yes" to the error message, get departure city step 401 instructs customer 101 to provide a new city. If customer 101 responds "no" to the error message, customer 101 is given the option of being transferred to a reservations agent.

After the customer-entered departure city has been confirmed, book award step 207 next prompts customer 101 to speak the desired arrival city in get arrival city step 403. Similarly, if the customer-entered departure city is not a city from which the airline departs, get arrival city step 403 plays an error message to customer 101. An example error message is "We do not travel into or out of <city>, would you like to depart from another city?" If customer 101 responds "yes" to the error message, get arrival city step 403 instructs customer 101 to provide a new city. If customer 101 responds "no" to the error message, customer 101 is given the option of being transferred to a reservations agent.

If customer 101 enters the same city for both the departure and arrival cities in get departure city step 401 and get arrival city 403, customer 101 is played an error message by book award step 207. For example, the error message may be "The flight origin and destination cannot be the same. Would you like to change the origin or destination city?" If customer 101 responds "yes" to the error message, customer 101 is directed to speak a new arrival and/or destination city. If customer 101 responds "no" to the error message, customer 101 is given the option of being transferred to a reservations agent.

Book award step 207 then prompts customer 101 to speak the desired outbound travel date in get outbound travel date step 405. The customer-entered outbound travel date is then repeated to customer 101 for verification. If the outbound travel date is not valid, get outbound travel date step 405 plays an error message such as "The date you have given is not valid. Let's try again. What date do you want to depart?" Customer 101 then enters a new outbound travel date in response to the error message.

Customer 101 is next prompted to enter in the desired return travel date in get return travel date step 407. Once customer 101 enters a return travel date, get return travel date step 407 repeats the return travel date to customer 101 for verification. If the return travel date is not valid, get outbound travel date step 405 plays an error message such as "The date you have given is not valid. Let's try again. What date do you want to return?" Customer 101 then enters a new return travel date in response to the error message.

Book award step 207 next directs customer 101 to enter the desired flight class (e.g., First, Business, Coach, etc.) in get class of service step 409. The customer-entered class of service is then repeated to customer 101 for verification. If the requested class of service is not available, an error message is played. Particular classes of service, such as first class or business class, may not be available on all flights. For example, if customer 101 selects first class, the error message may be "First class is not available on your requested flight. Would you like a different class of service?" If customer 101 responds "yes" to the error message, customer 101 is directed to choose a new class of service by get class of service step 409. If customer 101 responds "no" to the error message, customer 101 is given the option of being transferred to a reservations agent.

Customer 101 is then prompted to speak the desired award type in get award type step 411. For example, one award type may be used if the desired itinerary occurs over one month ahead of the date of scheduling. If the selected award type cannot be handled by the automated reservations system of the present invention, a message such as "To book your requested itinerary, this call must be handled by a reservations agent. Please hold. The next available reservations agent will be with you shortly. I will pass the collected data to the reservations agent" is played to customer 101. Get award type 411 transfers the customer-entered departure city, arrival city, outbound travel date, return travel date, class of service, and award type to reservations agent 115 via a "screen-pop." A screen-pop transfers all of the caller-entered information to the appropriate field on reservation agent's 115 computer terminal, thereby allowing reservation agent 115 to better assist customer 101.

Finally, the caller is prompted to speak the number of passengers at get number of passengers step 413. The automated reservations system of the present invention may optionally have a limit on the number of passengers the system can book. If the customer-entered number of passengers is greater than this number, an error message is played to customer 101. An example error message may be "The automated system will book up to six travelers. For more travelers, please hold and the next available representative will be with you. I will pass the collected data to the representative." Get award type step 411 then transfers the customer-entered departure city, arrival city, outbound travel date, return travel date, class of service, award type, and number of passengers to reservations agent 115 via a "screen-pop."

Book award step 207 next determines the amount of frequent flyer miles required to complete the requested itinerary in price itinerary step 415. Price itinerary step 415 utilizes awards database 209 to determine the required number of frequent flyer miles. For example, a domestic flight might require less frequent flyer miles then an international flight.

After the number of frequent flyer miles required for the selected itinerary has been determined, query customer database step 417 determines if customer 101 has sufficient frequent flyer miles to make the requested reservation. Query customer database step 417 accomplishes this by comparing the required frequent flyer miles amount determined in step 415 to the amount of frequent flyer miles located in customer's 101 frequent flyer account located in customer database 203. If sufficient funds exist, customer 101 is allowed to either hold the reservation in hold reservation step 213 or to ticket the reservation in ticket reservation step 215.

However, if customer 101 does not have the required number of frequent flyer miles, query customer database step 417 plays an error message such as "There are not enough miles in your account to book travel for the requirements you have given. Do you wish to reduce the number of passengers traveling?" If customer 101 responds "yes" to the error message, customer 101 is asked to speak a new number of passengers. Price itinerary step 415 and query customer database step 417 are then repeated utilizing the new number of passengers. If customer 101 responds "no" to the error message, customer 101 is transferred to reservations agent 115.

Figure 5:
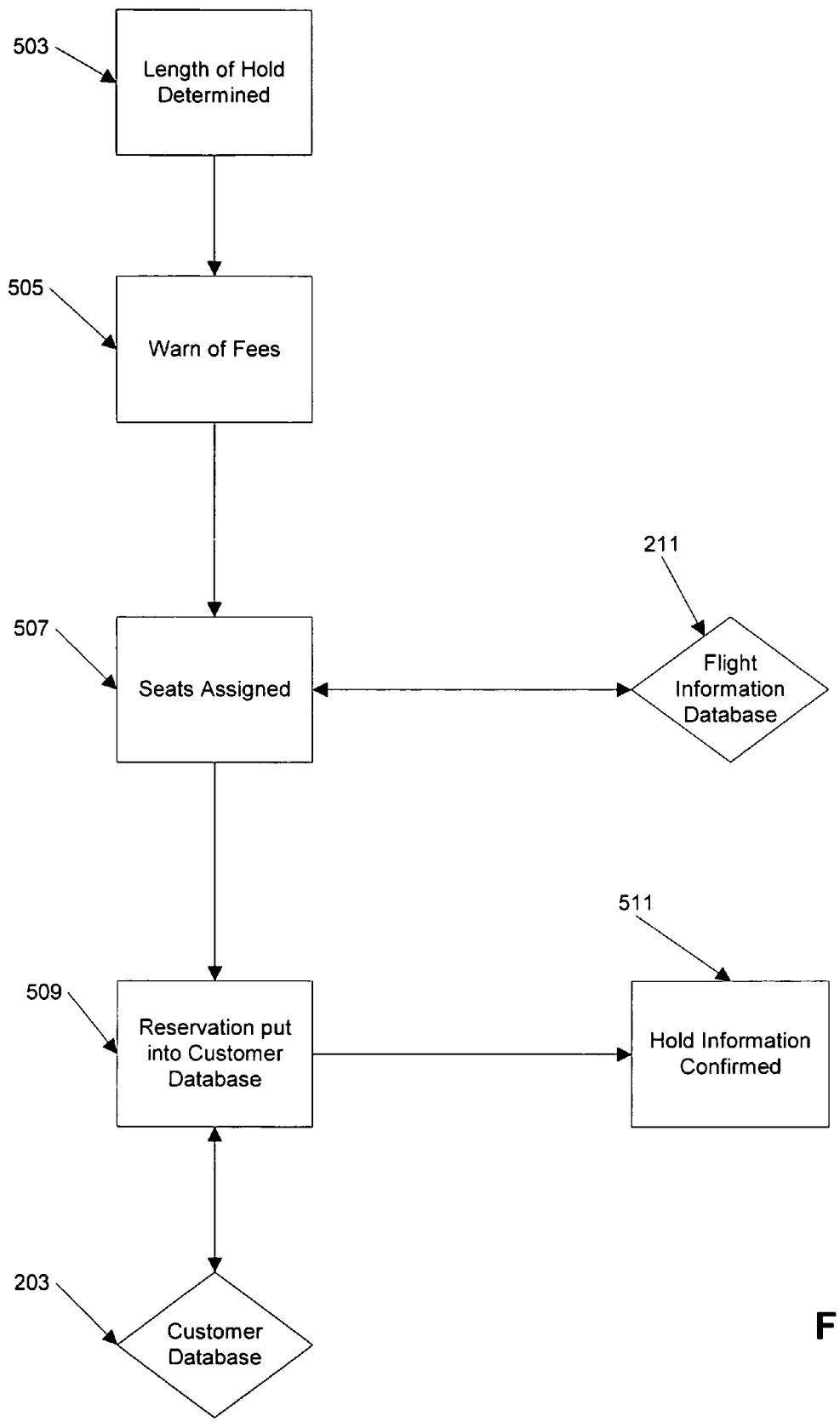
FIG. 5 depicts the hold reservation call script diagram contained in the automated reservations system of the preferred embodiment of the present invention.

Referring now to FIG. 5, shown is the hold reservation call flow diagram utilized by hold reservation step 213. Hold reservation step 213 is utilized by the reservations system of the present invention to allow customer 101 to put the itinerary developed in book award step 207 on hold. After customer 101 decides to place the selected itinerary on hold, hold reservation step 213 first determines the period of time that the held reservation will be valid for in determine length of hold step 503. The determined period of time is then announced to customer 101. If customer 101 fails to ticket the held reservation within the determined amount of time, the held reservation is purged from the reservations system.

Customer 101 is then notified of any fees which may be applicable to a held reservation in warn of fees step 505. For example, customer 101 may be required by the reservations system to pay a flat fee or a certain percentage of the total cost of the itinerary in order to put it on hold. Seats for the held itinerary are selected utilizing assign seats step 507. For example, customer 101 is prompted by assign seats step 507 to indicate whether an aisle or window seat is preferred. Utilizing this information, assign seats step 507 queries flight information database 211 to determine which seats are available. Assign seats step 507 is utilized to assign a seat to every passenger in the customer-selected itinerary. Assign seats step 507 then updates the available seating information in flight information database 211 once each seat has been selected.

Once assign seats step 507 is complete, hold reservation step 213 next updates customer database 203 in update customer database step 509 to indicate that customer 101 now has a flight itinerary on hold. The held flight itinerary information is then repeated to the caller for confirmation in hold confirmation step 511. The held flight itinerary information may include, but is not limited to, a hold reference number, the marketing carrier, the operating carrier, the flight numbers, the departure airport code, the departure city name, the departure date, the departure time, the arrival airport code, the arrival city name, the arrival date, the arrival time, the class of service, the number of passengers by passenger type, the number of frequent flyer miles utilized per ticket, the total number of frequent flyer miles utilized, the taxes and fees per person, the total price per passenger type, the total price for all passenger types, customer's 101 name, customer's 101 frequent flyer number, customer's 101 telephone number, and customer's 101 e-mail. If customer 101 has an e-mail address located in customer's 101 account in customer database 203, hold confirmation step 511 sends customer 101 a confirmation e-mail.

Figure 6A:
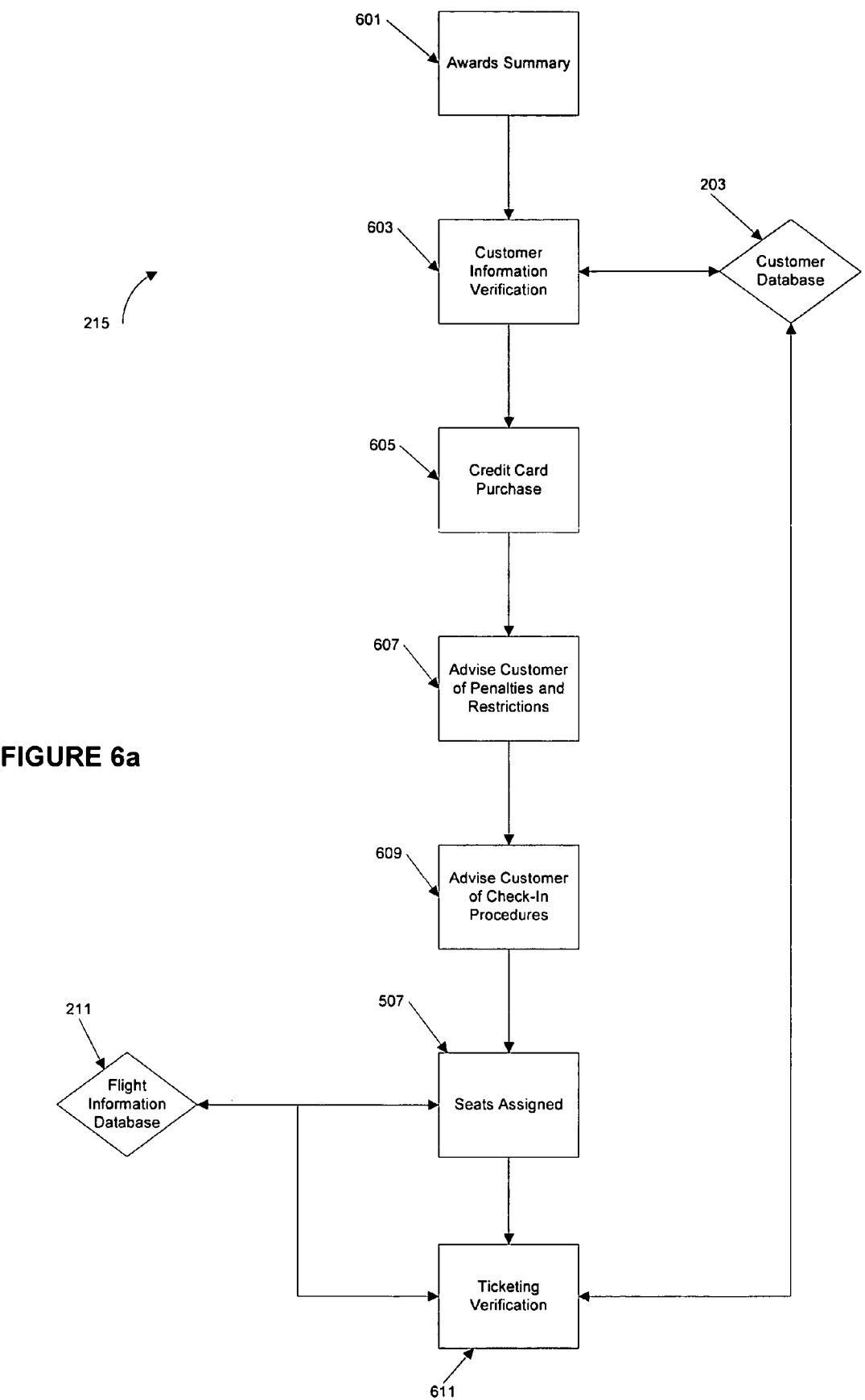
FIG. 6A depicts the ticketing call script diagram offered to the user after the awards booking call script diagram of FIG. 4.

Now referring to FIG. 6A, shown is the call script utilized by ticket reservation step 215 if customer 101 chooses to ticket the requested itinerary after book awards step 207 is complete. Customer 101 is first quoted an award summary for review by awards summary step 601. The awards summary contains such information as the number of passengers by passenger type, frequent flyer miles per ticket, total frequent flyer miles, taxes and fees per ticket, and the total price of the selected itinerary. If customer 101 confirms that all of the award summary information is correct, customer 101 is next prompted to verify that the customer contact information is correct in customer information verification step 603. Customer information verification step 603 utilizes the contact information located in customer database 203 to prompt customer 101 with contact information for verification. The contact information provided to customer 101 includes information such as the customer's name and associated frequent flyer number, phone number, e-mail, etc.

Ticket reservation step 215 next prompts customer 101 to enter a valid credit card number and expiration date in credit card purchase step 605. A credit card number is required by the flight reservations system to cover additional costs not covered by frequent flyer miles such as taxes, flight destination charges, etc. Any known credit card transaction technique may be utilized by credit card purchase step 605 to acquire and process credit card information. For example, credit card purchase step 605 may check the entered credit card number for the appropriate amount of digits.

If a valid credit card number was entered in credit card purchase step 605, customer 101 is advised of all penalties and restrictions and the check-in procedures required for each purchased ticket in penalties and restrictions step 607 and in check-in procedures step 609, respectively.

Customer 101 may then utilize assign seats step 507 to select seats as previously described in reference to hold reservations step 213. After seat selection is completed, customer 101 may elect to book the selected itinerary in ticketing verification step 611. If customer 101 chooses to accept the selected itinerary, ticketing verification step 611 updates customer database 203 to indicate that customer 101 has purchased the selected itinerary. Ticketing verification step 611 also updates flight information database 211 to indicate that the seats selected by customer 101 are no longer available.

Figure 6B:
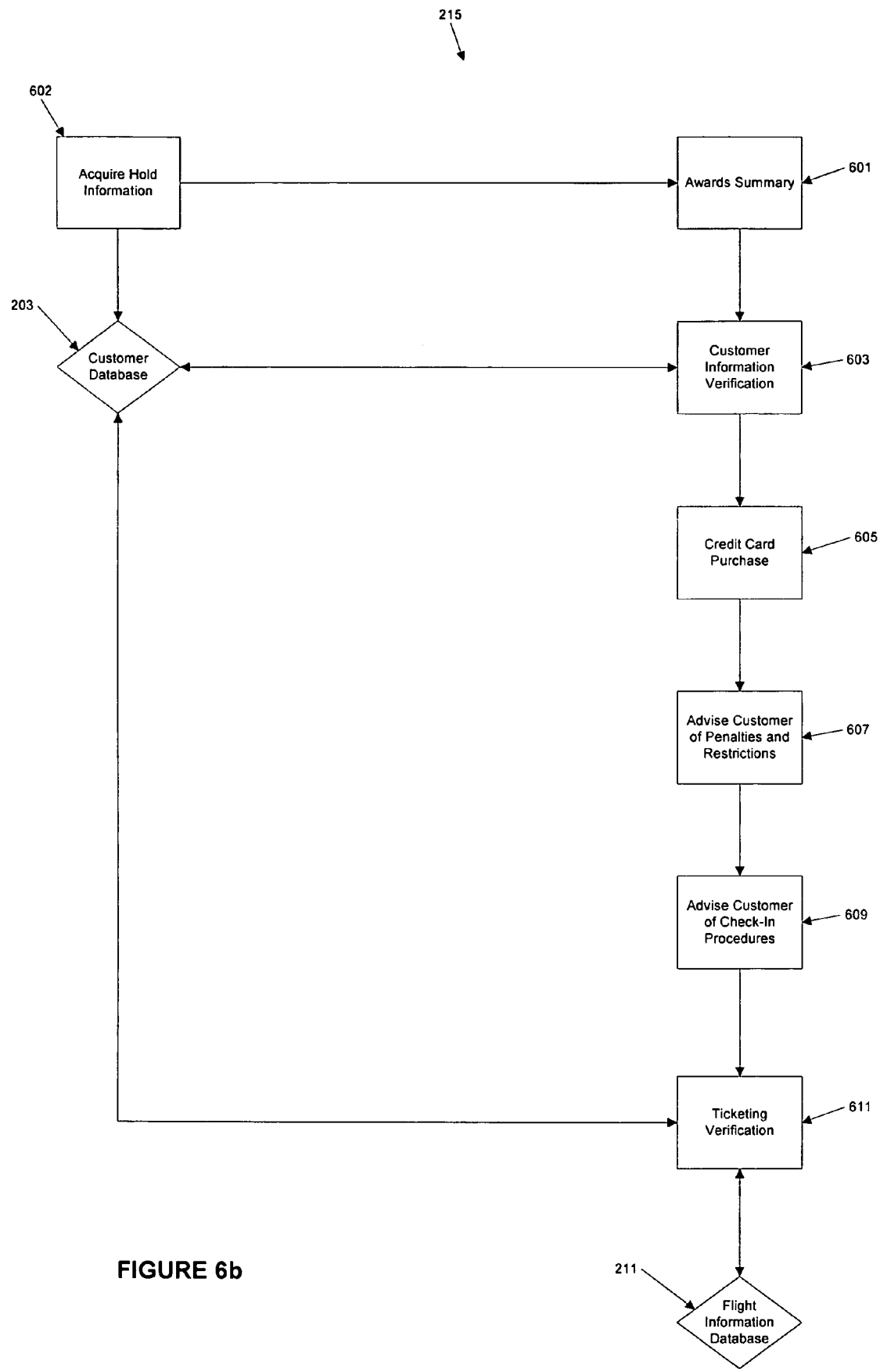
FIG. 6B depicts the ticketing call script diagram provided to the user as the ticketing procedure progresses from the customer authentication call script diagram of FIG. 3.

Now referring to FIG. 6B, shown is the call script utilized by ticket reservation step 215 if customer 101 wishes to ticket a previously reserved itinerary. In this scenario, ticket award step 215 proceeds from customer authentication step 201 instead of book award step 207 as occurs in FIG. 6A. Customer 101 is first directed to provide the outbound flight number, travel date, the last name associated with the held reservation in acquire hold information step 602. Acquire hold information step 602 queries customer database 203 to retrieve the correct itinerary.

Customer 101 is then quoted an award summary for review by awards summary step 601. The awards summary contains such information as the number of passengers by passenger type, frequent flyer miles per ticket, total frequent flyer miles, taxes and fees per ticket, and the total price of the selected itinerary. If customer 101 confirms that all of the award summary information is correct, customer 101 is next prompted to verify that the customer contact information is correct in customer information verification step 603. Customer information verification step 603 utilizes the contact information located in customer database 203 to prompt customer 101 with contact information for verification. The contact information provided to customer 101 includes information such as the customer's name and associated frequent flyer number, phone number, e-mail, etc.

Ticket reservation step 215 next prompts customer 101 to enter a valid credit card number and expiration data in credit card purchase step 605. A credit card number is required by the flight reservations system to cover additional costs not covered by frequent flyer miles such as taxes, flight destination charges, etc. Any known credit card transaction technique may be utilized by credit card purchase step 605 to acquire and process credit card information.

If a valid credit card number was entered in credit card purchase step 605, customer 101 is advised of all penalties and restrictions and the check-in procedures required for each purchased ticket in penalties and restrictions step 607 and in check-in procedures step 609, respectively.

Customer 101 may then elect to book the selected itinerary in ticketing verification step 611. If customer 101 chooses to accept the selected itinerary, ticketing verification step 611 updates customer database 203 to indicate that customer 101 has purchased the selected itinerary. Ticketing verification step 611 also updates flight information database 211 to indicate that the seats selected by customer 101 are no longer available for purchase.

Figure 7:
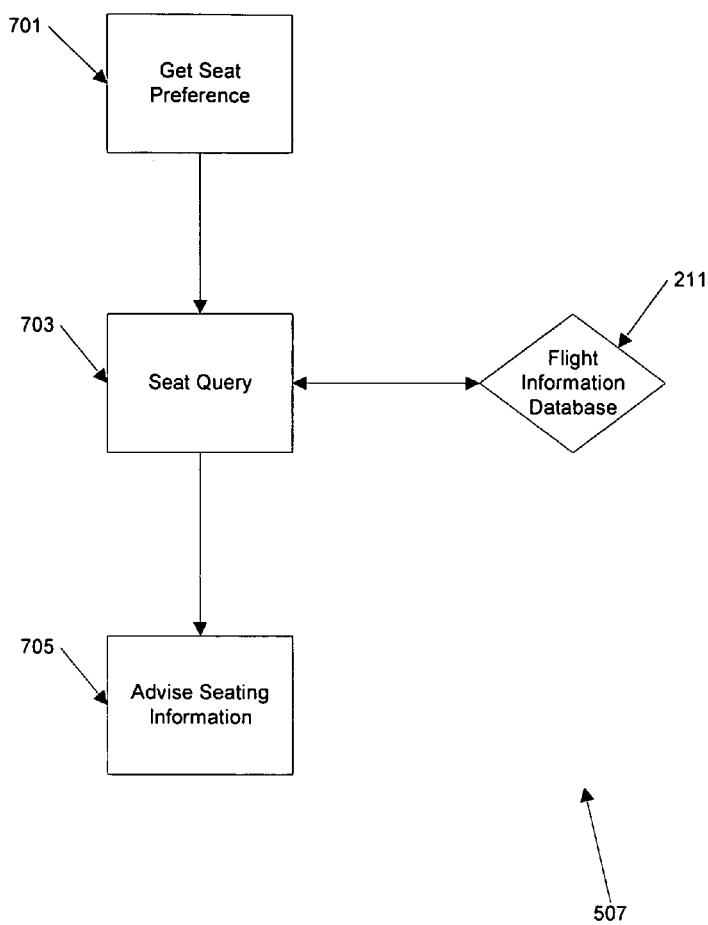
FIG. 7 depicts the preferred embodiment of the seat assignment call script for use with the automated reservations system of the present invention.

Now referring to FIG. 7, shown is the preferred embodiment of assign seats step 507 utilized in FIG. 5 and FIG. 6A. Assign seats step 507 first directs customer 101 to enter in the desired seat preference (i.e., an isle seat or a window seat) for the first passenger in the flight itinerary in get seat preference step 701. To determine if the requested seating preference is available, seat query step 703 queries flight information database 211 which contains the status of all available seats on all available flights. Seat query step 703 then assigns a seat to the first passenger in the flight itinerary and removes the available seat from flight information database 211. Customer 101 is advised of the seating information in advise seating information step 705. Get seat preference step 701, seat query step 703, and advise seating information step 705 are repeated for every passenger in customer's 101 flight itinerary.

Figure 8:
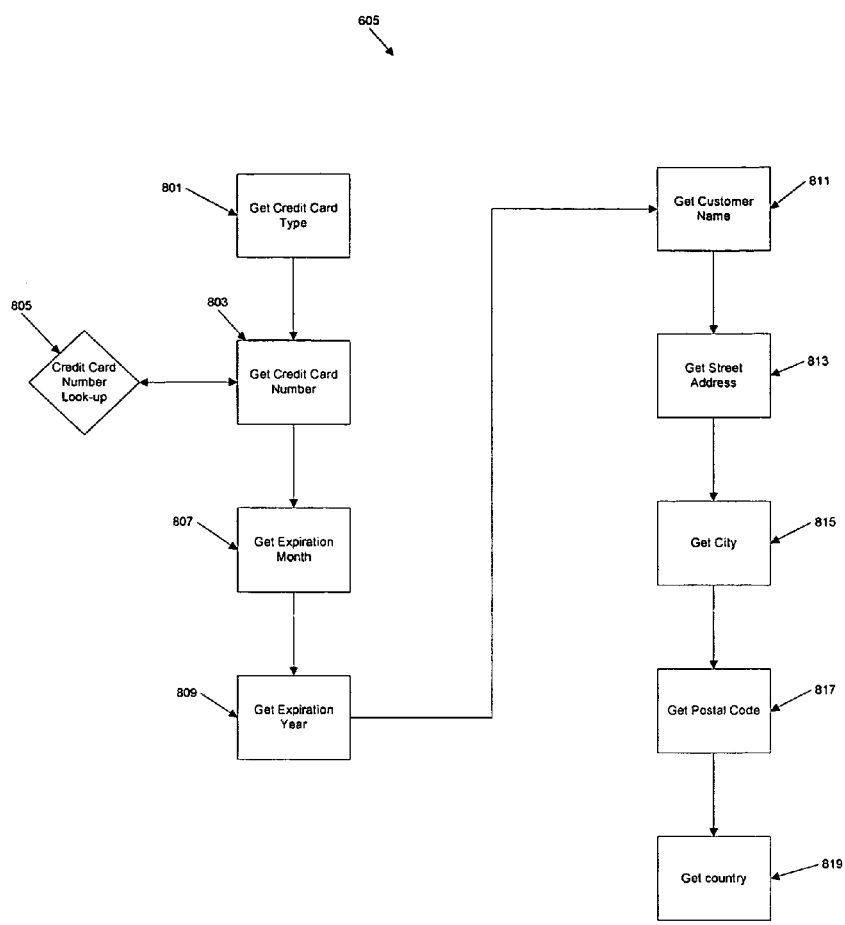
FIG. 8 depicts the credit card information retrieval call script for use with the automated reservations system of the present invention.

Referring next to FIG. 8, shown is the preferred embodiment of credit card purchase step 605 shown in FIG. 6A and FIG. 6B. Customer 101 is prompted to enter the credit card type in get credit card type step 801. Customer 101 is next directed to enter the credit card number in get credit card number step 803. Get credit card number step 803 utilizes credit card number look-up table 805 to determine if the entered credit card number is the appropriate length. For example, a card number has thirteen digits whereas another credit card number has fourteen digits. If customer 101 enters an invalid credit card number as determined by the credit card number query, get credit card number step 803 directs customer 101 to provide a valid credit card number.

If the credit card number entered by customer 101 is valid, customer 101 is directed to enter an expiration month and an expiration year in get expiration month step 807 and get expiration year step 809, respectively. Next, customer 101 is directed to enter the name as it appears on the credit card in get customer name 811. Customer 101 is then directed to enter a street address, city, postal code, and country in get street address step 813, get city step 815, get postal code step 817, and get country step 819, respectively.

Figure 9:
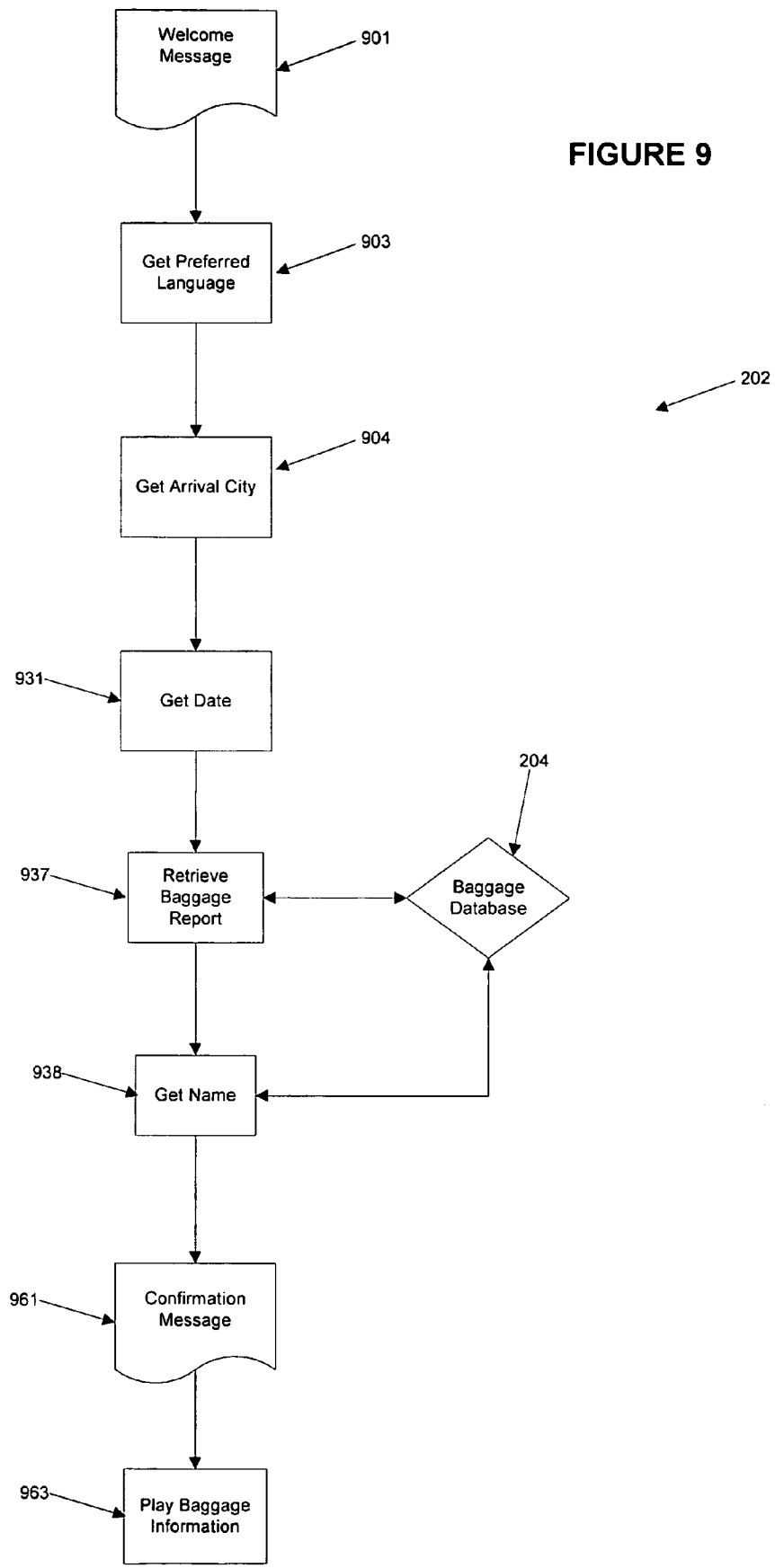
FIG. 9 depicts the preferred embodiment of the call script diagram for use with the baggage information system according to the present invention.
Figure 9A:
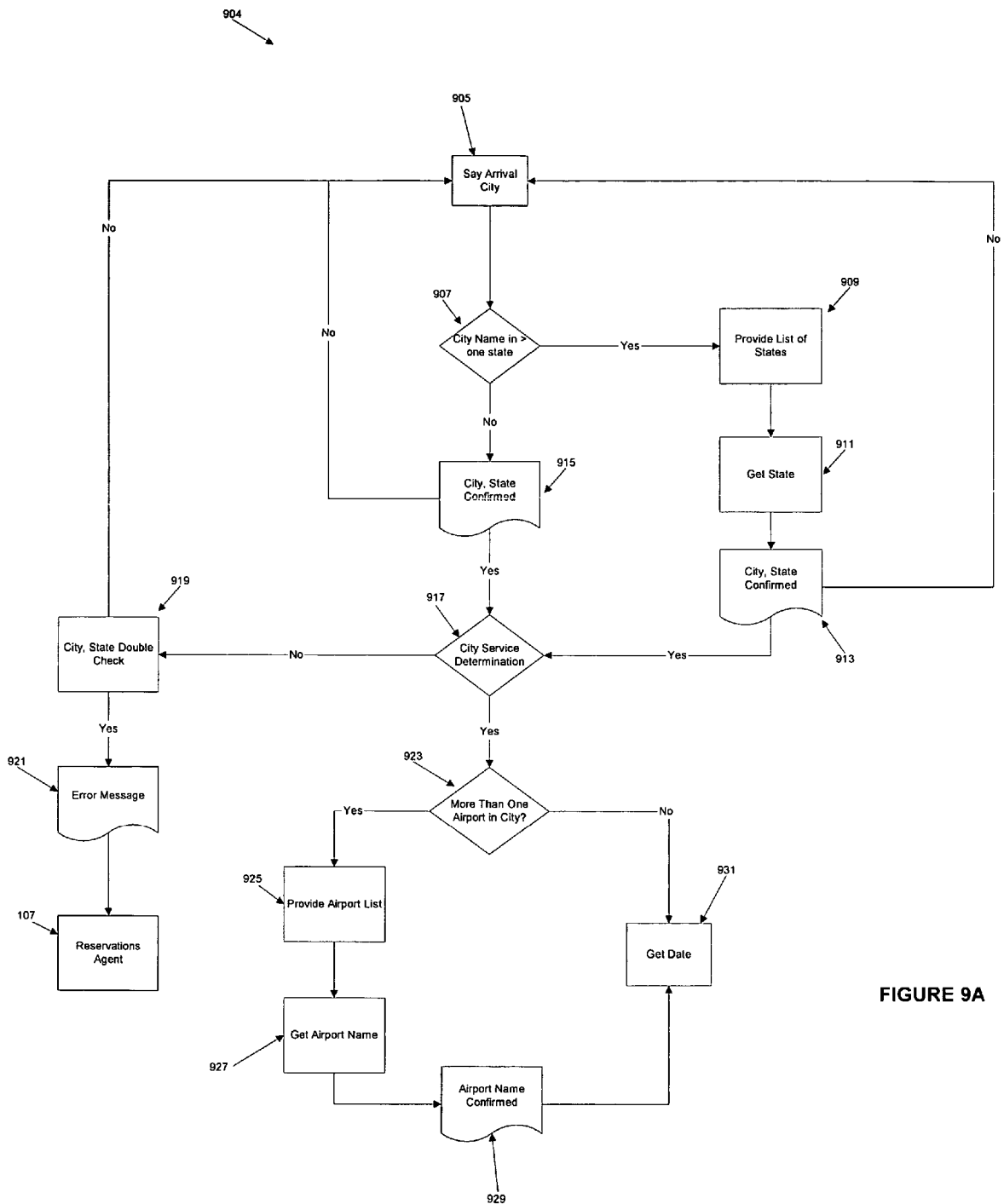
FIG. 9A depicts the call script diagram utilized to acquire the arrival city from a customer while interacting with the baggage information system according to the present invention.

Referring next to FIG. 9, shown is the call flow diagram utilized for baggage information system 202 depicted in FIG. 2. Customer 101 is initially greeted by baggage information system 202 in step 901. Customer 101 is then prompted to choose a preferred language for the voice prompts provided by baggage information system 202 in step 903. In the preferred embodiment, baggage information system 202 is capable of providing prompts both in English and Spanish. However, the system of the present invention is capable of providing voice prompts in any language and recognizing customer 101 provided vocal responses in any language. Customer 101 is next prompted to provide an arrival city in step 904, discussed in greater detail in FIG. 9A. As shown in FIG. 9A, customer 101 is initially prompted to speak the arrival city in step 905. Baggage information system 202 then determines if the spoken arrival city is located in more than one state in step 907. For example, if customer 101 speaks "Newark" in step 905, baggage information system 202 needs to determine if customer 101 requested Newark, N.J., Newark, Del., etc. If the stated arrival city is located in more than one state, baggage information system 202 provides a list of states to customer 101 that contain the requested arrival city in step 909. Customer 101 speaks the desired state to baggage information system 202 in step 911. Thereafter, baggage information system 202 repeats the city, state combination to customer 101 for verification in step 913. If customer 101 says "no" in response to step 913, customer 101 is again asked to provide an arrival city by step 905. If customer 101 responds "yes" to step 913, baggage information system 202 next proceeds to step 917 which determines if the airline conducts business in the arrival city.

Similarly, if baggage information system 202 determines that the arrival city name occurs in only one state in step 907, baggage information system 202 repeats the city, state combination to customer 101 for confirmation in step 915. If customer 101 responds "no" to step 915, customer 101 is again asked to provide an arrival city in step 905. If customer 101 confirms the city state combination, baggage information system 202 next proceeds to step 917 which determines if the airline conducts business in the arrival city.

If baggage information system 202 determines that the airline does not conduct business in the stated arrival city, state, baggage information system 202 repeats the city, state combination to customer 101 in step 919. If customer 101 responds "no" to step 919, customer 101 is again asked to provide an arrival city in step 905. If customer 101 responds "yes" to step 919, customer 101 is provided an error message by baggage information system 202 in step 921 indicating that the airline does not provide service in the stated arrival city. Customer 101 is then transferred to reservations agent 115 to be assisted with the baggage query.

If baggage information system 202 determines that the airline does provide service in the stated arrival city in step 917, baggage information system 202 next determines if there is more than one airport in the arrival city in step 923. If baggage information system 202 determines that there is more than one airport in the stated arrival city, baggage information system 202 provides a list of airports to customer 101 in step 925. Customer 101 is then prompted to speak the desired airport name in step 925. The chosen airport is confirmed in step 929. After the airport name has been confirmed in step 929, customer 101 is transferred to step 931. Similarly, if baggage information system 202 determines that there is only one airport in the stated arrival city in step 923, customer 101 is transferred to step 931 (FIG. 9B).

Figure 9B:
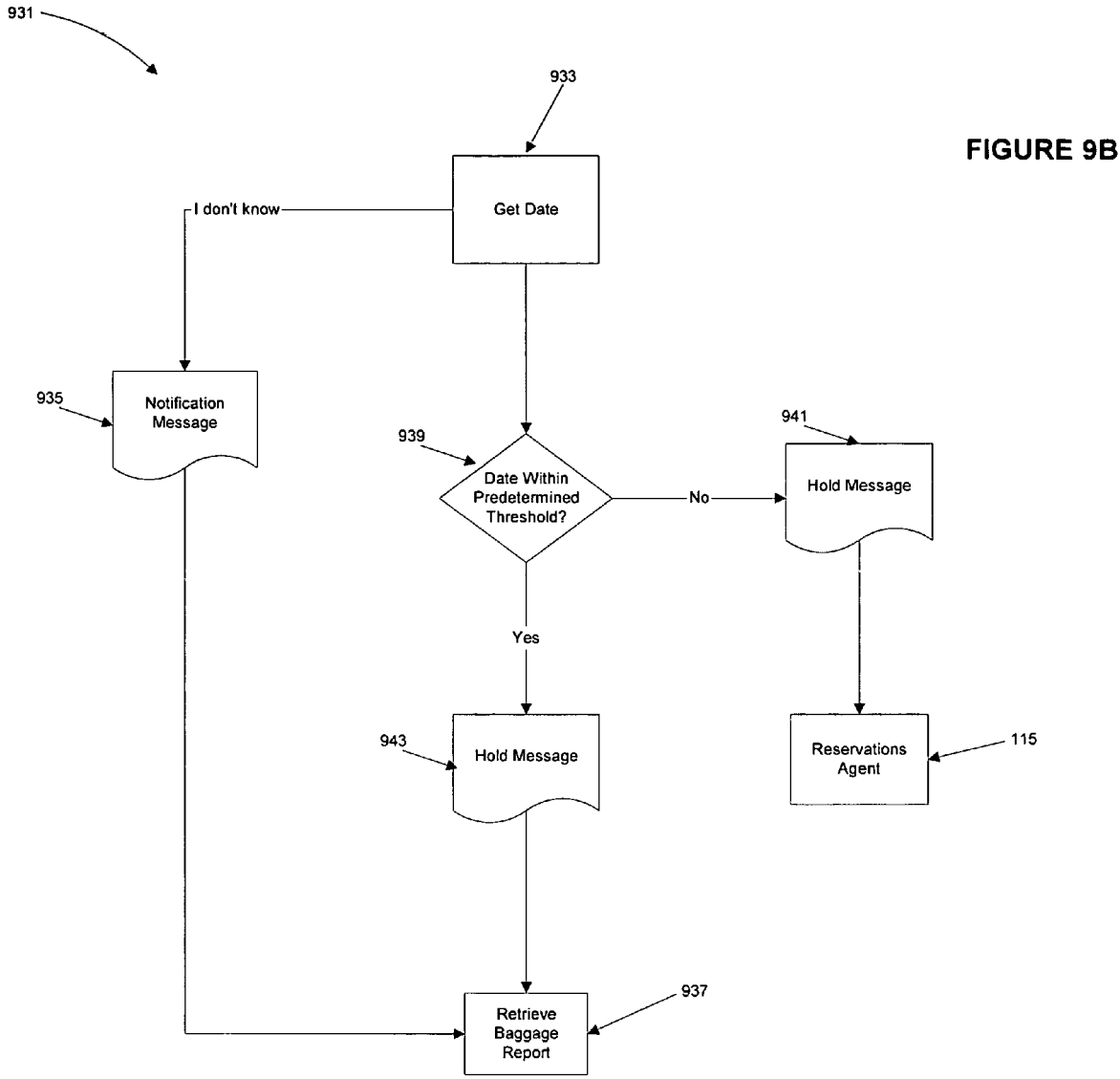
FIG. 9B depicts the call script diagram utilized to obtain the arrival date from a customer for use with the baggage information system according to the present invention.

As shown in FIG. 9B, baggage information system 202 initially directs customer 101 to provide the date the baggage arrived in step 933. If customer 101 states "I don't know," or a similar message indicating that customer 101 is unaware of the arrival date, customer 101 is provided a notification message in step 935. Thereafter, customer 101 is directed to step 937. If customer 101 provides an arrival date to baggage information system 202 in step 933, baggage information system 202 next determines if the provided arrival date is within a predetermined threshold in step 939. A predetermined threshold is utilized because only baggage information for a certain period of time is accessible by baggage information system 202. For example, if the predetermined threshold utilized by step 939 is five days, baggage information system 202 may only access the last five days of baggage information. If baggage information system 202 determines that the date is not within the predetermined threshold, baggage information system 202 provides customer 101 with a hold message in step 941. Customer 101 is then transferred to reservations agent 115 for assistance with the baggage information query.

If baggage information system 202 determines that the provided arrival date is within the predetermined threshold, customer 101 is provided a hold message in step 943 indicating that baggage information system 202 is retrieving the baggage information for the provided arrival date from baggage database 204 in step. Customer 101 is then transferred to step 937 (shown in FIG. 9).

Now referring back to FIG. 9, baggage information system 202 next queries baggage database 204 in step 937 utilizing the arrival city and date provided by customer 101 in steps 904 and 931. Baggage database 204 returns all baggage information to baggage information system 202 which matches the stated arrival city and date. Customer 101 is then prompted by baggage information system 202 to provide the customer's 101 name and associated tracer assigned to each piece of customer's 101 baggage in step 938 (discussed in greater detail with reference to FIG. 9C).

Figure 9C:
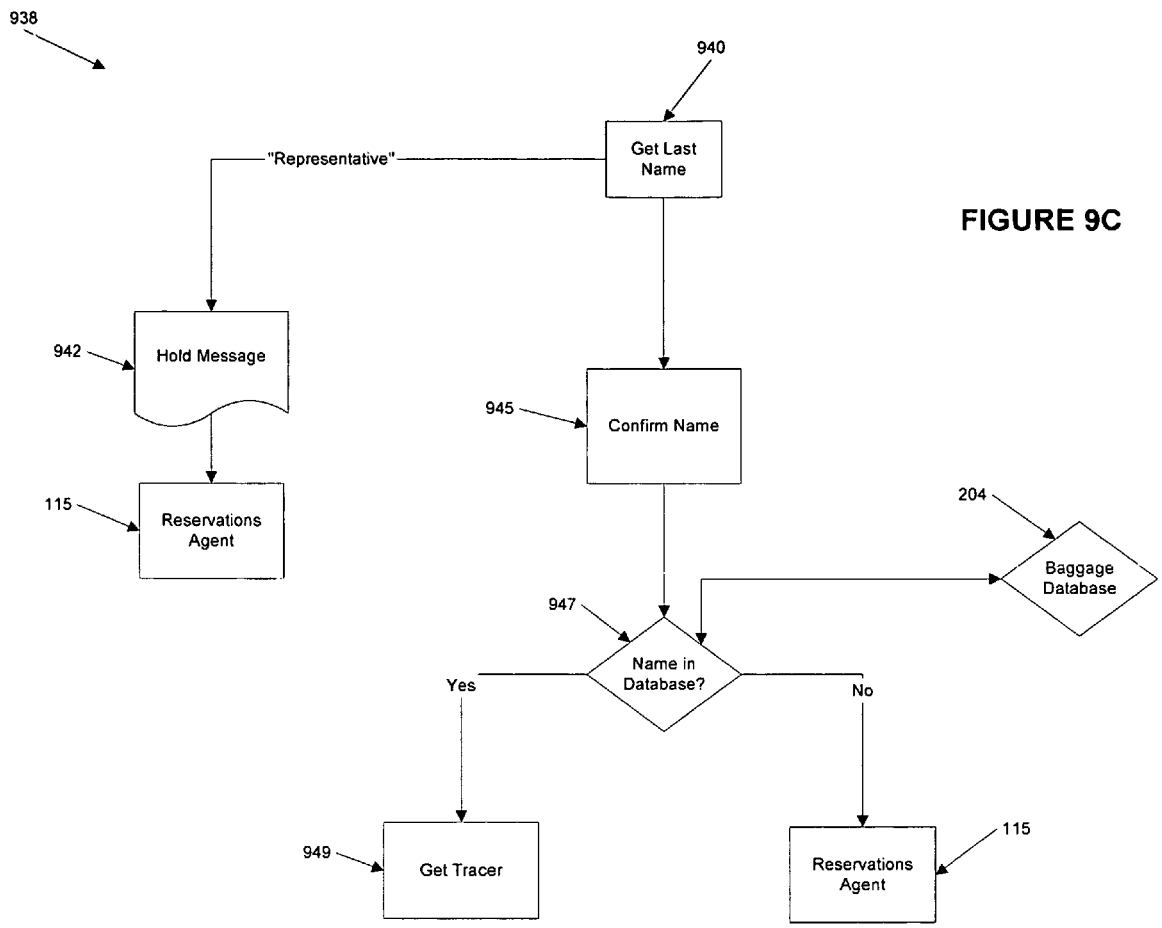
FIG. 9C depicts the call script diagram utilized to acquire the last name of the customer for use with the baggage information system according to the present invention.

As shown in FIG. 9C, baggage information system 202 directs customer 101 to provide customer's 101 last name in step 940. Customer 101 may respond either by stating a last name or by stating "representative." If customer 101 elects to state "representative," customer 101 is provided a hold message in step 942 and then transferred to a reservations agent 115 for assistance. Alternatively, if customer 101 states a last name in response to step 940, baggage information system 202 repeats the entered last name to customer 101 for confirmation in step 945. Next, baggage information system 202 queries the search results of step 937 in step 947 to determine if the stated last name is in the search results. If the last name is not in the search results, customer 101 is transferred to a reservations agent 115. If the last name is in the search results, customer 101 is transferred to step 949 (FIG. 9D).

Figure 9D:
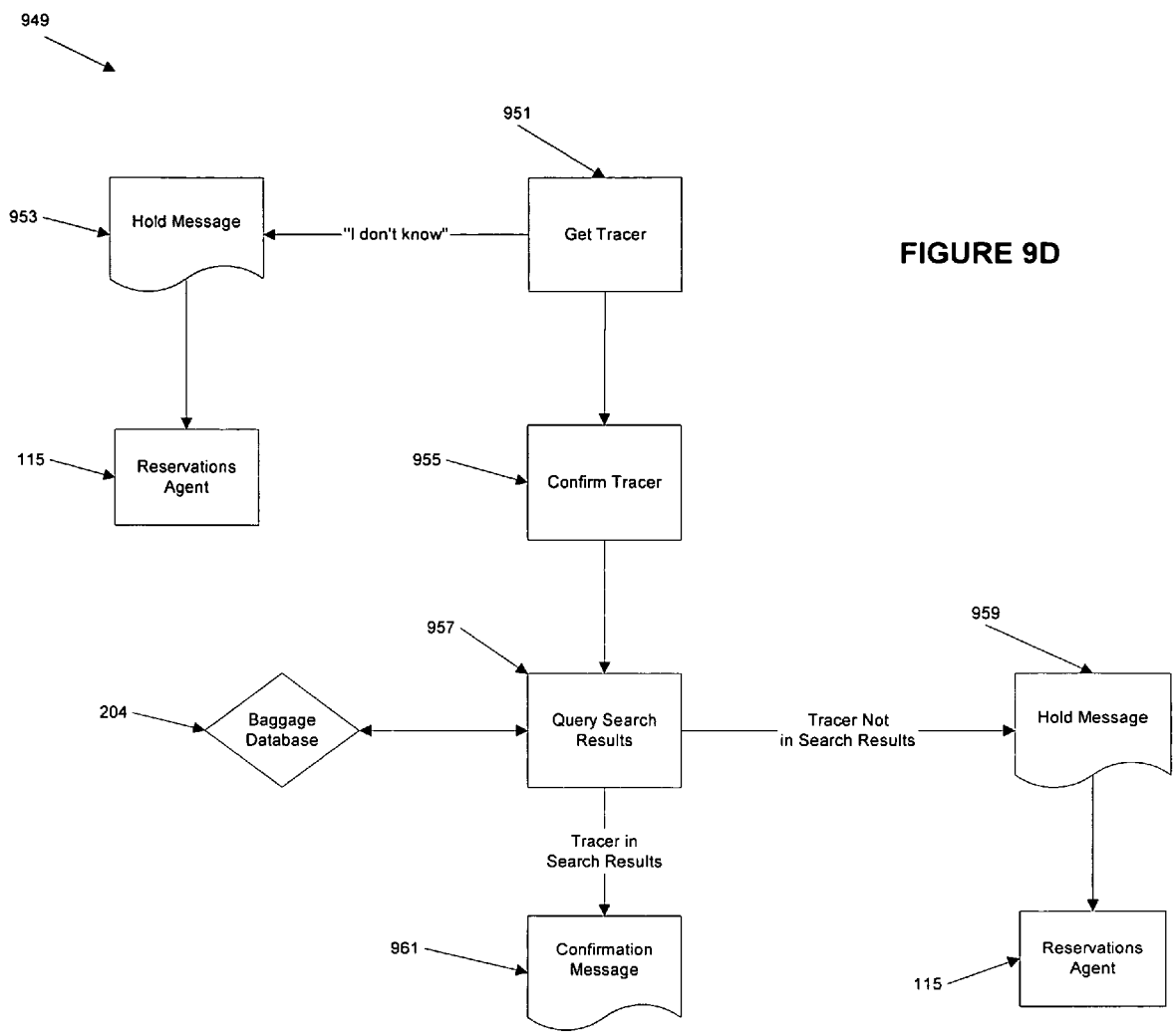
FIG. 9D depicts the call flow diagram utilized to obtain the tracer information from a customer for use with the baggage information system according to the present invention.

As shown in FIG. 9D, customer 101 is directed by baggage information system 202 to provide the tracer associated with the customer's 101 baggage in step 951. If customer 101 states "I don't know" in response to step 951, customer 101 is provided a hold message by baggage information system 202 in step 953 and transferred to reservations agent 115 for assistance. If customer 101 provides a tracer in step 951, baggage information system 202 repeats the tracer to customer 101 for confirmation in step 955. Once the tracer has been confirmed by customer 101, baggage information system 202 queries the search results of step 947 in step 957 to determine if baggage information exists for the provided arrival city, arrival date, last name, and tracer. If the provided tracer is not in the search results, customer 101 is provided a hold message in step 959 and transferred to the appropriate reservations agent 115. However, if the provided tracer is in the search results, customer 101 is provided a confirmation message in step 961 indicating that a matching baggage information record has been found in the database (also depicted in FIG. 9). Now referring again to FIG. 9, baggage information system 202 provides the requested baggage information to customer 101 in step 963. The baggage information may include, but is not limited to the arrival city, arrival date, customer's first and last name, baggage location (e.g., gate number, terminal, etc.), type of baggage, baggage status, and estimated arrival time.

The present invention also incorporates a notification system which notifies a customer if any changes occur to the customer's planned flight itinerary. When a change occurs, the notification system sends a text or voice message to the customer's preferred means of contact stored in the customer's profile. The methods of contact may include a cellular telephone, e-mail, a pager, a personal digital assistant, a telephone, a fax machine, etc. The customer may choose to receive flight status at a scheduled time, if changes occur, or both.

I claim:

1. A computer-implemented method of providing automated services comprising the steps of:
    interacting with a user via an automated interactive voice response system;
    authenticating said user utilizing one or more forms of identification data provided by said user to said automated interactive voice response system;
    querying an awards database to determine whether an awards account is associated with said user;
    acquiring itinerary data from said user;
    querying an itinerary database with said itinerary data and receiving a plurality of itineraries;
    providing to said user said plurality of itineraries;
    receiving from said user a selection of an initial itinerary from said plurality of itineraries;
    querying said awards database and determining if said user's awards account contains sufficient awards for said initial itinerary;
    upon determination that said user does not contain sufficient awards for said initial itinerary, providing to said user an alternative itinerary for which said user's awards account contains sufficient awards;
    receiving from said user a selection of said alternative itinerary;
    ticketing said selected alternative itinerary;
    prompting said user to enter baggage data;
    acquiring baggage data from said user, wherein the baggage data comprises arrival date;
    determining whether the arrival date is within a predetermined threshold;
    if the arrival date is within said predetermined threshold, querying a baggage database with said baggage data for information in said baggage database and providing said information to said user; and
    if the arrival date is outside said predetermined threshold, transferring said user to an operator.

2. The computer-implemented method according to claim 1, further including the step of:
    confirming said selected itinerary.

3. The computer-implemented method according to claim 1 wherein said user interacts with said automated interactive voice response system utilizing vocal responses.

4. The computer-implemented method according to claim 1, further including the step of:
    assigning seats to said user for said selected itinerary.

5. The computer-implemented method according to claim 1, wherein said user is transferred to an operator upon request.

6. The computer-implemented method according to claim 1, wherein said itinerary data includes one or more of the group consisting of a departure date, an arrival date, a departure time, an arrival time, departure location, arrival destination, number of passengers, class of service, and seating preference.

7. The computer-implemented method according to claim 1, wherein said identification data is biometric data.

8. The computer-implemented method according to claim 7, wherein said identification data is voice data.

9. The computer-implemented method according to claim 1, wherein said identification data is at least one of the group consisting of a user's name, a personal identification number, a social security number, a telephone number, a birth date, and a frequent flyer number.

10. The computer-implemented method according to claim 1, wherein said awards database is a look-up table.

11. A computer-implemented method of providing automated services comprising the steps of:
   interacting with a user via an automated interactive voice response system;
   authenticating said user utilizing one or more forms of identification data provided by said user to said automated interactive voice response system;
   utilizing said identification data to access an awards account;
   querying an awards database to determine whether an awards account is associated with said user;
   acquiring itinerary data from said user;
   querying an itinerary database with said itinerary data;
   providing to said user a plurality of itineraries;
   prompting said user to select an itinerary from said plurality of itineraries;
   querying an awards database to determine if said user's awards account contains sufficient awards for said selected itinerary;
   upon determination that said user does not contain sufficient awards for said selected itinerary, providing to said user an alternative itinerary for which said user's awards account contains sufficient awards;
   receiving from said user a selection of said alternative itinerary;
   ticketing said selected alternative itinerary;
   prompting said user to enter baggage data;
   acquiring baggage data from said user, wherein the baggage data comprises arrival date;
   determining whether the arrival date is within a predetermined threshold;
   if the arrival date is within said predetermined threshold, querying a baggage database with said baggage data for information in said baggage database and providing said information to said user; and
   if the arrival date is outside said predetermined threshold, transferring said user to an operator.

12. The computer-implemented method according to claim 11, further including the step of:
   confirming said selected itinerary.

13. The computer-implemented method according to claim 11 wherein said user interacts with said automated interactive voice response system utilizing vocal responses.

14. The computer-implemented method according to claim 11, further including the step of:
   assigning seats to said user for said selected itinerary.

15. The computer-implemented method according to claim 11, wherein said user is transferred to an operator upon request.

16. The computer-implemented method according to claim 11, wherein said itinerary data includes one or more of the group consisting of a departure date, an arrival date, a departure time, an arrival time, departure location, arrival destination, number of passengers, class of service, and seating preference.

17. The computer-implemented method according to claim 11, wherein said identification data is biometric data.

18. The computer-implemented method according to claim 17, wherein said identification data is voice data.

19. The computer-implemented method according to claim 11, wherein said identification data is at least one of the group consisting of a user's name, a personal identification number, a social security number, a telephone number, a birth date, and a frequent flyer number.

20. The computer-implemented method according to claim 11, wherein said awards database is a look-up table.

21. The computer-implemented method according to claim 11, wherein said automated services are provided by an airline.

22. The computer-implemented method according to claim 21, where said user is a customer of said airline.

* * * * *